United States Patent [19]
Umeda et al.

[11] Patent Number: 5,719,760
[45] Date of Patent: Feb. 17, 1998

[54] DIRECT-MOUNTED VEHICLE GENERATOR USING LOW HEAT PRODUCING SIC RECTIFIERS

[75] Inventors: Atsushi Umeda, Anjo; Makoto Taniguchi; Shin Kusase, both of Obu, all of Japan

[73] Assignee: Nippondenso Co., Ltd., Kariya, Japan

[21] Appl. No.: 658,691

[22] Filed: Jun. 5, 1996

[30] Foreign Application Priority Data

Jun. 6, 1995 [JP] Japan ................... 7-139737

[51] Int. Cl.$^6$ ............... H02M 1/00; H02P 6/00
[52] U.S. Cl. .................... 363/145; 322/16
[58] Field of Search ............. 363/145; 310/62, 310/89; 322/10, 11, 14, 15, 16, 34; 257/77, 260

[56] References Cited

U.S. PATENT DOCUMENTS

| | | | |
|---|---|---|---|
| 3,697,814 | 10/1972 | Christman et al. | 317/100 |
| 4,162,414 | 7/1979 | Takabatake | 310/68 R |
| 4,499,390 | 2/1985 | Iwaki et al. | 310/88 |
| 4,739,204 | 4/1988 | Kitamura et al. | 310/68 D |
| 5,075,616 | 12/1991 | Mitsui | 322/10 |
| 5,170,231 | 12/1992 | Fujii et al. | 357/23.7 |
| 5,233,215 | 8/1993 | Baliga | 257/490 |
| 5,323,040 | 6/1994 | Baliga | 257/332 |
| 5,389,799 | 2/1995 | Uemoto | 255/77 |
| 5,396,085 | 3/1995 | Baliga | 257/77 |
| 5,399,515 | 3/1995 | Davis et al. | 437/40 |
| 5,473,191 | 12/1995 | Tanaka | 257/680 |
| 5,543,703 | 8/1996 | Kusase et al. | 322/16 |

FOREIGN PATENT DOCUMENTS

| | | |
|---|---|---|
| 656661 | 6/1995 | European Pat. Off. . |
| 4-138030 | 5/1992 | Japan . |
| 4-239778 | 8/1992 | Japan . |
| 7-131016 | 5/1995 | Japan . |

OTHER PUBLICATIONS

"Proceeding of the 28th Intersociety Energy Conversion Engineering Conference", vol. 1, Aug. 8–19, 1993, pp. 1.249–1.254.

NASA Tech. Briefs, "Electronic Components and Circuits" Feb. 1995, pp. 29–31.

Akira Suzuki et al, Japan Journal of Applied Physics, "Thermal Oxidation of SiC and Electrical Properties of ... SiCMOS Structure", vol. 21 No. 4, Apr. 1982 pp. 579–585.

"Silicon Carbide and Related Materials" Proceeding of the fifth Conference, 1–3 Nov. 1993 pp. 54–58.

"SiC and Relating Wide Gap Semiconductor Research, The Third Meeting Draft" 1994 pp. 1–2.

Palmour, et al: "6H-Silicon Carbide Power Devices for Aerospace Applications", Proceedings of the 28th Intersociety Energy Conversion Engineering Conference., vol. 1, Aug. 8–13, 1993, pp. 1249–1254.

*Primary Examiner*—Adolf Berhane
*Attorney, Agent, or Firm*—Cushman, Darby & Cushman IP Group of Pillsbury Madison & Sutro LLP

[57] ABSTRACT

To directly mount a generator to an engine block without causing overheating of the generator or a rectifier, a voltage regulator incorporates a rectifier which employs monocrystalline silicon carbide (SIC) MOS power transistors as semiconductor rectifying devices. This voltage regulator is fixed to housings of a generator, and the housings of the generator are directly mounted to an engine block. In this construction, it is possible to prevent overheating of the rectifier in the voltage regulator as well as of armature windings and a field coil of the generator regardless of an increase in the amount of heat transferred to the generator due to direct mounting.

20 Claims, 12 Drawing Sheets

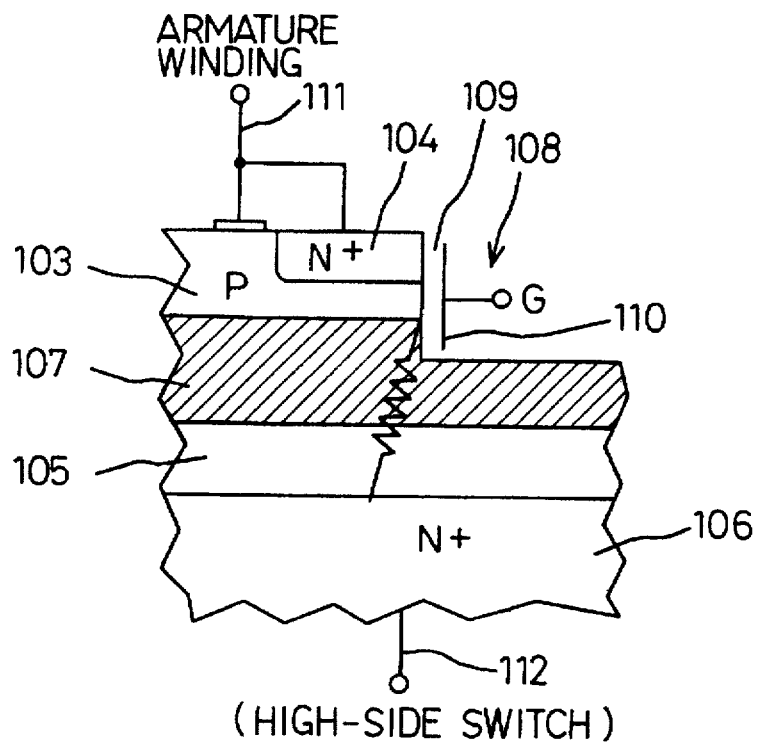
FIG. 4 (HIGH-SIDE SWITCH)
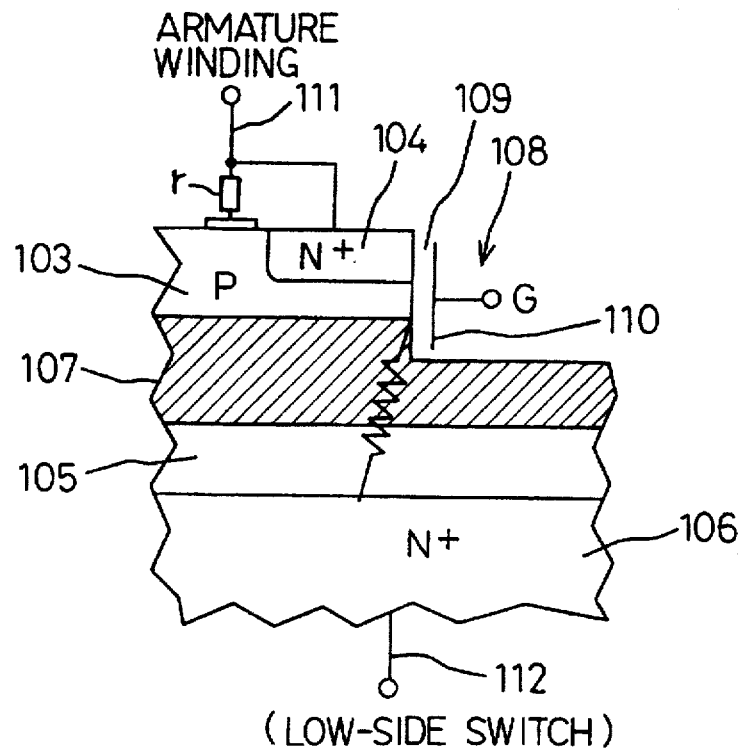
FIG. 5 (LOW-SIDE SWITCH)

FWD. ← → REV.

DIRECT-MOUNTED VEHICLE GENERATOR USING LOW HEAT PRODUCING SIC RECTIFIERS

CROSS-REFERENCE TO RELATED APPLICATION

The present application is related to and claims priority from Japanese Patent Application No. Hei. 7-139737, incorporated herein by reference.

BACKGROUND OF THE INVENTION

1. Field of the Invention

The present invention relates to an alternating current (AC) generator which is associated with a rectifier and fixed to an engine block.

2. Description of Related Art

A conventional AC generator for a motor vehicle used to be directly mounted to an engine block by part of a (usually one piece) mounting arm or stay sticking out from a housing of the AC generator, with the other part of the stay fixed to the engine block by means of a bracket which was made as a separate component from the engine block. Although this generator mounting method was advantageous in reducing the resonant natural frequency determined by the bracket and the amount of heat transfer from the engine block to the generator, it posed such problems as a complicated generator mounting process and the need for a large space for installing the generator. To provide a solution to these problems, it has previously been proposed to eliminate the bracket, which is an intermediate mounting element, and directly mount the generator to the engine block.

On the other hand, a rectifier used with an AC generator for a motor vehicle is usually mounted by fixing its cooling fin, which serves as a radiating board as well as a bus bar, to the housing of the AC generator by means of an electrically insulating resin member.

Japanese Laid-Open Patent Publication No. Hei 4-138030 discloses an arrangement in which MOS power transistors are used as semiconductor rectifying devices in a rectifier.

Although the aforementioned direct generator mounting method which eliminates the need for a bracket is advantageous for the reduction in space and man-hours required for the installation of the generator, there still remains a problem of reliability for reasons described below.

Firstly, the elimination of the bracket results in an increase in the amount of heat transfer from the engine to the generator, and this causes a problem in that high temperatures could develop in the generator, especially in its armature and field windings, as well as in the rectifier. It should be possible to lower the temperature of the rectifier by improving its heat radiating efficiency by means of large-sized cooling fins. Provision of such large-sized cooling fins would, however, develop another problem in that the temperatures of the armature and field windings become even higher.

Secondly, the cooling fins of the rectifier have large sizes and heavy weight for improvement of heat radiating efficiency as described above and are dynamically cantilevered to the generator housing by means of an electrically insulating resin member so that individual portions of the cooling fins can vibrate relative to the generator housing. Therefore, if vibration transmitted from the engine to the generator housing increases as a result of the elimination of the bracket, vibration of the cooling fins relative to the generator housing also increases. The larger and heavier the cooling fins, the greater this relative vibration. On the other hand, semiconductor chips are attached to the cooling fins, and a bus bar (conductor bar) which is supported by the cooling fins or the housing with an intermediate member and connected to the semiconductor chips has elasticity so that the bus bar can vibrate relative to the semiconductor chips. If vibration of the cooling fins relative to the generator housing increases as a result of the elimination of the bracket, vibration of the bus bar (printed conductor) relative to the semiconductor chips also increases, causing a durability problem in the connection between the bus bar and semiconductor chips. Especially if the cooling fins are made larger for improvement of the heat radiating efficiency of the rectifier as described above, reliability of the connections between the aforementioned semiconductor chips and printed conductor would deteriorate.

SUMMARY OF THE INVENTION

The present invention has been made to solve the aforementioned problems. Accordingly, it is an object of the invention to provide an AC generator for a motor vehicle which can realize simplification of the generator mounting process and a reduction in generator installation space by eliminating the bracket without increasing the size of the cooling fins of the rectifier.

The inventors have examined the feasibility of employing a rectifier which utilizes MOS power transistors as semiconductor rectifying devices to achieve the above object. Unlike a rectifier using diodes as semiconductor rectifying devices, the rectifier employing MOS power transistors is free from internal heat generation due to forward junction loss, and its only loss is ohmic loss. This means that there is the possibility of reducing the temperature of the rectifier which may increase during operation. Analysis by the inventors has, however, revealed that the aforementioned conventional MOS power transistor type three-phase full-wave rectifier is associated with the following problems.

To begin with, three-phase armature windings and a field coil of a motor vehicle AC generator are capable of storing a large amount of magnetic energy. It is therefore necessary to give each semiconductor power device of a three-phase full-wave rectifier a minimum withstand voltage of 300 V, for instance, which is at least twenty times higher than battery voltage, or the rectified output voltage of the three-phase full-wave rectifier, in order to prevent the stored magnetic energy from being released in an instant. In addition, an output current capacity of 100 A or more is desired due to the recent increase in vehicle-mounted electric loads (e.g., defrosting heaters). Power loss of a MOS power transistor meeting the requirements for such a high withstand voltage and a large output current becomes comparable to that of a diode. This makes it senseless to use MOS power transistors, which have a complicated structure, instead of diodes.

The aforementioned problems of the MOS power transistor type three-phase full-wave rectifier are analyzed in further detail with reference to FIGS. 3 and 4, of which FIG. 3 shows an inverter circuit which corresponds to a one-phase circuit portion of a MOS power transistor type three-phase full-wave rectifier, while FIG. 4 shows an example of cross-sectional structure of a typical MOS power transistor.

In the configuration of the n-channel MOS power transistor-based inverter circuit shown in FIG. 3, a drain electrode D of a high side MOS power transistor 101 and a source electrode S of a low side MOS power transistor 102 are connected to an output terminal of one phase of a three-phase AC generator (not shown), a drain electrode D of the low side MOS power transistor 102 is connected to a low-potential terminal of a battery (not shown), and a source electrode S of the high side MOS power transistor 101 is connected to a high-potential terminal of the battery. It is to be noted that the direction of a charging current and the moving direction of electrons during a charging process are opposite to each other.

In either of the MOS power transistors 101 and 102, there are unavoidably formed a source electrode side parasitic diode Ds between a p-type well region and the source electrode S and a drain electrode side parasitic diode Dd between the p-type well region and the drain electrode D, as illustrated.

To meet the need to give a potential to a p-type well region (e.g., region 103 in FIG. 4) which is a single conductivity type semiconductor region where an inverted channel is created in a surface area, the p-type well region is usually connected to an opposite conductivity type source region S (e.g., region 106 in FIG. 4) or a drain region D (e.g., region 104 in FIG. 4), either of which is caused to conduct by the inverted channel. When using this inverter circuit as a one-phase circuit portion of a three-phase full-wave rectifier, it is necessary to connect between the p-type well region (e.g., region 103 in FIG. 4) and drain electrode D (e.g., region 104 in FIG. 4), that is to say, short-circuit the parasitic diode Dd on the drain electrode side, as shown in FIG. 3.

More particularly, if the source electrode side parasitic diode Ds is short-circuited by connecting between the p-type well region (e.g., region 103 in FIG. 4) and source electrode S (e.g., region 106 in FIG. 4) in a motor vehicle AC generator, a reverse current will flow through the drain electrode side parasitic diode Dd when a generated voltage applied to the drain electrode D of a high side MOS power transistor drops below the battery voltage. Similarly, a reverse current will flow through the drain electrode side parasitic diode Dd when the generated voltage applied to the source electrode S of a low side MOS power transistor rises beyond the potential (ground potential) of the low-potential terminal of the battery. As such, the need arises to connect the p-type well region 103 to the drain electrode for preventing the reverse currents by use of the source electrode side parasitic diode Ds. It is necessary to connect the p-type well region (e.g., region 103 in FIG. 4) of each MOS power transistor used in a motor vehicle AC generator to the drain electrode, in any case.

In the conventional vertical MOS power transistor structure shown in FIG. 4, however, there is no alternative but to short-circuit the p-type well region 103 and an n+-type region 104 formed in its surface area and cause a p-n junction depletion layer 107 between the p-type well region 103 and an n-type epitaxial withstand layer 105 to spread toward the n-type epitaxial withstand layer side in order to obtain an increased withstand voltage.

In other words, when the above-described MOS power transistor structure of FIG. 4 is used to construct a motor vehicle AC generator, there is no alternative but to use an n+-type substrate 106 as a source region and the n+-type region 104 as a source region. This configuration, however, causes a large parasitic source resistance Rs of the n-type withstand layer 105 to be connected in series between a practical source terminal S' and the source electrode.

Disregarding threshold voltage Vt for the sake of simplification, saturation drain current Idsat of a MOS transistor is $$Idsat = K(Vg-Vs')^2 = K(Vgs-Idsat\ Rs)^2 \quad (1)$$

where K is a constant of proportionality, Vgs is a gate-to-source voltage (Vg–Vs), Vg is a gate voltage, and Vs'=Vs+ Idsat·Rs is a voltage at the substantial source terminal S'. This means that the saturation drain current (i.e, the maximum current obtained when a given gate voltage is applied) Idsat is equivalent to what is obtained when the gate voltage Vg has decreased by as much as Idsat. Rs. Variation in the threshold voltage Vt due to the body effect is also disregarded in the discussion herein.

Assuming that the gate voltage is +20 V, source (battery) voltage +12 V, current 100 A, and parasitic source resistance Rs 0.05 Ω, an actual source voltage Vs becomes 17 V, which translates into a drop in channel current down to 9/64 of what is obtained when Rs=0. This means that a slight increase in the parasitic source resistance Rs results in a dramatic decrease in channel current. This drop in channel current, or an increase in channel resistance, is referred to as a source resistance feedback effect in the following explanation.

While the aforementioned formula applies to a saturation drain current domain, the drain current decreases in a non-saturation drain current domain as well in a similar way due to an increase in Rs. Such a decrease in the drain current is synonymous with an increase in the channel resistance, and it should be recognized that the increase in the parasitic source resistance Rs causes not only a power loss by itself but also a power loss due to a subsequent increase in channel resistance, resulting in a significant power loss and heat generation as a whole.

Needless to say, it would be possible to reduce the thickness of the n-type withstand layer 105 to decrease the parasitic source resistance Rs in the MOS power transistor structure of FIG. 4. However, it is practically difficult to reduce the thickness of the n-type withstand layer 105 because the motor vehicle AC generator requires a withstand voltage as high as 300 V, as previously mentioned.

More particularly, the breakdown electric field strength of silicon used in an ordinary silicon MOS power transistor is about 30 V/μm. To obtain the above-mentioned withstand voltage of 300 V with only the n-type withstand layer 105, its thickness should be at least 10 μm even when the n-type withstand layer 105 has a uniform internal electric field strength. Provided that the electric field strength in the n-type withstand layer 105 is about 30 V/μm, it is essential that the thickness of the n-type withstand layer 105 is about 20 μm or over and its doping concentration is about $1 \times 10^{15}$ atoms/cm$^3$ in order that the n-type withstand layer 105 withstands 300 V.

If the n-type withstand layer 105 is made so thick with such a high level of doping concentration to ensure sufficient withstand voltage capability, the result would be an increase in the parasitic source resistance Rs and subsequent ohmic loss as well as a decrease in the drain current (i.e., a significant increase in channel resistance). This means that the MOS power transistor type three-phase full-wave rectifier disclosed in the previously mentioned document cannot outperform a p-n junction diode-type three-phase full-wave rectifier for use in a motor vehicle AC generator (i.e., in reactive load applications) from the theoretical point of view. It just brings such disadvantages as a complicated structure and control and no advantage in practical applications.

An alternative approach would be to use the n+-type region 104 and n+-type substrate 106 of the aforementioned MOS power transistor structure of FIG. 4 as a source electrode and drain electrode, respectively, and short-circuit the p-type well region 103 and n+-type drain region 106 as shown in FIG. 3. It is, however, extremely difficult to provide a withstand voltage as high as 300 V between the n+-type region (source electrode) 104 and p-type well region 103, and necessary withstand voltages between the gate electrode and p-type well region 103 or n+-type region 104.

The present invention has been made based on the analytical results that it is difficult to utilize presently available silicon MOS power transistors in a motor vehicle AC generator for the reasons described above, a dramatic increase in the resistance of withstand layers is essential for producing a MOS power transistor-type three-phase full-wave rectifier, a dramatic decrease in the thickness of the withstand layers and a dramatic increase in doping levels are essential, and such a dramatic decrease in the thickness of the withstand layers and an increase in doping levels can only be achieved by dramatic enhancement in the breakdown electric field strength of the withstand layers, and recognizing that the power loss and heat generation of the motor vehicle AC generator can be significantly reduced if the breakdown electric field strength of the withstand layers is successfully enhanced.

Accordingly, it is an object of the invention to make it possible to directly install an electrical generator to an engine block by mounting a rectifier featuring a significantly reduced power loss, a simple cooling system and excellent heat resistance to a generator housing, without increasing the size of rectifier cooling fins.

Therefore, according to a first aspect of the present invention, a motor vehicle AC generator includes a housing directly fixed to an engine block and a rectifier fixed to the housing. The motor vehicle AC generator is driven by a crankshaft of the engine. The rectifier includes a semiconductor rectifying device which includes MOS transistors, each substrate of which is produced by using monocrystalline SiC as a base material. The substrate has a single conductivity type semiconductor region associated with an inverted channel formed on a surface thereof as well as an opposite conductivity type source region and a drain region, which are caused to conduct by the inverted channel.

As already mentioned, three-phase armature windings of a motor vehicle AC generator are capable of storing a large amount of magnetic energy and, therefore, it is necessary to give each semiconductor power device of a three-phase full-wave rectifier a minimum withstand voltage of 300 V, for instance, which is at least twenty times higher than battery voltage, that is, the rectified output voltage of the three-phase full-wave rectifier, in order to prevent the magnetic energy from being released in an instant. In addition, the motor vehicle AC generator is required to provide a maximum output current of at least 100 A nowadays due to the recent increase in vehicle-mounted electric loads.

The breakdown electric field strength of SiC is about 400 V/μm, which is approximately thirteen times higher than that of silicon. The fact that the breakdown electric field strength of SiC is remarkably higher than that of Si means that the power loss of MOS power transistors when they are used as constituent devices of a motor vehicle AC generator can significantly be reduced. This power loss reduction effect resulting from the aforementioned difference in breakdown electric field strength is now described in further detail in the following.

The discussion here deals with a case where the aforementioned motor vehicle AC generator employs SiC MOS power transistors as shown in FIG. 3 to achieve a withstand voltage of 300 V, for instance. To simplify the discussion, it is assumed that the withstand voltage of 300 V is entirely provided by an n-type epitaxial withstand layer 105 (see FIG. 4, for instance). Assuming that the withstand voltage of 300 V is provided by the n-type withstand layer 105 alone for the sake of simplification and the breakdown electric field strength of SiC is 400 V/μm, the required thickness of the n-type withstand layer 105 is about 4 μm, its doping concentration is about $2\times10^{16}$ atoms/cm$^3$, and its resistivity is about 1.25 Ω·cm. On the other hand, the required thickness of a 300 V withstand layer of the aforementioned Si MOS power transistor is about 20 μm, its doping concentration is about $1\times10^{15}$ atoms/cm$^3$, and its resistivity is about 5 Ω·cm. It is therefore possible to reduce the resistance of the n-type withstand layer 105 of a SiC MOS power transistor down to 1/20th that of the n-type withstand layer 105 of a Si MOS power transistor. Needless to say, the doping concentration of the n-type withstand layer 105 can be made smaller than the above values depending on a relationship with the doping concentration of the p-type well region 103.

Consequently, the motor vehicle AC generator employing the SiC MOS power transistors of this invention offers such excellent effects that ohmic power loss of each withstand layer, or parasitic source resistance Rs, can be significantly reduced, a reduction in the aforementioned source resistance feedback effect leads to a significant reduction in channel resistance, a synergistic effect thereof serves to reduce losses to a large extent compared to a motor vehicle AC generator employing Si MOS power transistors or a diode-type three-phase full-wave rectifier, of which power loss is almost of the same level as the motor vehicle AC generator employing the Si MOS power transistors, and the arrangement for cooling can be remarkably simplified.

As seen above, the three-phase full-wave rectifier employing the SiC MOS power transistors provides significantly lower losses and higher heat resistance in comparison with existing three-phase full-wave rectifiers for motor vehicles. This makes it possible to reduce the size of cooling fins which used to be large in the conventional rectifiers as well as the ratio of housing surface area occupied by the cooling fins. This in turn helps increase the size of a cooling air inlet hole, through which cooling air flows into the housing, and improve armature and field winding cooling efficiency. Consequently, it becomes possible to prevent overheating of the armature and field windings exceeding a permissible temperature level regardless of whether the amount of heat transferred to the generator increases as a result of the direct connection between the generator housing and engine block.

It is also possible to reduce vibration of the cooling fins themselves and stresses (vibromotive force) that occur at joints between individual semiconductor chips and wiring conductor due to the vibration of the cooling fins, because the size of the cooling fins can be significantly reduced from conventional sizes thanks to the above-mentioned reduction in heat generation and the improvement in thermal resistance of the rectifier. This would help improve the reliability of electrical connections inside the rectifier.

To summarize, the use of the SiC MOS power transistors makes it possible to directly mount the generator to the engine block without increasing the size of the cooling fins of the rectifier and consequently realize an improvement in the reliability of the rectifier, simplification of the generator mounting process and a reduction in the generator installation space while avoiding a temperature increase of the armature and field windings.

Preferably, the motor vehicle AC generator is gear-driven by the crankshaft. This results in increased vibration of the generator housing, and of the cooling fins in consequence. The effects and advantages of the first construction would therefore become more evident in this construction.

Also, the rectifier may include a board on which the MOS transistors are mounted, the board serving also as a cooling fin, and a resin-molded portion which is affixed to the board and encloses internal wiring and the MOS transistors of the rectifier. This makes it possible to reduce stresses that occur at the joints between the individual MOS transistors (semiconductor chips) and internal wiring connected thereto.

The MOS transistors may constitute high side switches which individually connect between each output terminal of armature windings of the generator and a high-potential terminal of a battery as well as low side switches which individually connect between each output terminal of the armature windings of the generator and a low-potential terminal of the battery. Here, each of the high side switches is formed by a vertical MOS power transistor of which a p-type well region is connected to an n+ surface region thereof constituting a main electrode to be connected to the windings, and an n+ substrate is bonded to a B-terminal side cooling fin which is connected to the high-potential terminal of the battery. Also, each of the low side switches is formed by a vertical MOS power transistor of which a p-type well region is connected to an n+ surface region thereof constituting a main electrode to be connected to the windings via a high-resistance resistor, and an n+ substrate is bonded to a grounding side cooling fin which is connected to the low-potential terminal of the battery.

With this construction, it is possible to improve the cooling performance of the generator and simplify its wiring and structure. It is to be noted here that the high-resistance resistor for current limitation in each low side switch is for providing a desired potential to the p-type well region of each MOS transistor that constitutes a low side switch.

Incidentally, it is necessary to set a desired potential for the p-type well region of each vertical MOS transistor from an n+ region located on its surface. This is because it is required to provide a withstand voltage from an n-withstand layer provided between the n+ substrate and p-type well region.

It is possible that each of the high side switches is integrated in a first semiconductor chip and each of the low side switches is integrated in a second semiconductor chip. In this construction, it is possible to simplify the wiring and structure of the generator.

Also, the grounding side cooling fin may be attached to the housing of the motor vehicle AC generator in firm contact therewith and the B-terminal side cooling fin may be joined to the grounding side cooling fin with a resin insulating layer sandwiched therebetween. In this construction, it is possible to further improve the cooling performance of the generator and simplify its wiring and structure.

According to another aspect of the present invention, a motor vehicle AC generator includes a rectifier including high side switches which individually connect between each output terminal of armature windings and a high-potential terminal of a battery as well as low side switches which individually connect between each output terminal of the armature windings of the generator and a low-potential terminal of the battery. Each of the high side switches is formed by a vertical MOS power transistor of which a p-type well region and an n+ surface region are connected to an output terminal of the armature windings by means of a bus bar, and an n+ substrate is bonded to a B-terminal side cooling fin. Each of the low side switches is formed by a vertical MOS power transistor of which a p-type well region is connected, together with an n+ surface region thereof, to the low-potential terminal of the battery via a grounding wire, and an n+ substrate is bonded to the bus bar. In this way, it is possible to simplify the wiring and structure of the generator while maintaining a desired level of cooling performance.

Other objects and features of the invention will appear in the course of the description thereof, which follows.

BRIEF DESCRIPTION OF THE DRAWINGS

Additional objects and advantages of the present invention will be more readily apparent from the following detailed description of preferred embodiments thereof when taken together with the accompanying drawings in which:

FIG. 4 is a fragmentary enlarged cross-section showing an example of a MOS power transistor which constitutes each of high side switches 19a, 19b and 19c of the three-phase full-wave rectifier of FIG. 2;

FIG. 5 is a fragmentary enlarged cross-section showing an example of a MOS power transistor which constitutes each of low side switches 19d, 19e and 19f of the three-phase full-wave rectifier of FIG. 1;

DETAILED DESCRIPTION OF THE PRESENTLY PREFERRED EXEMPLARY EMBODIMENTS

Figure 1:
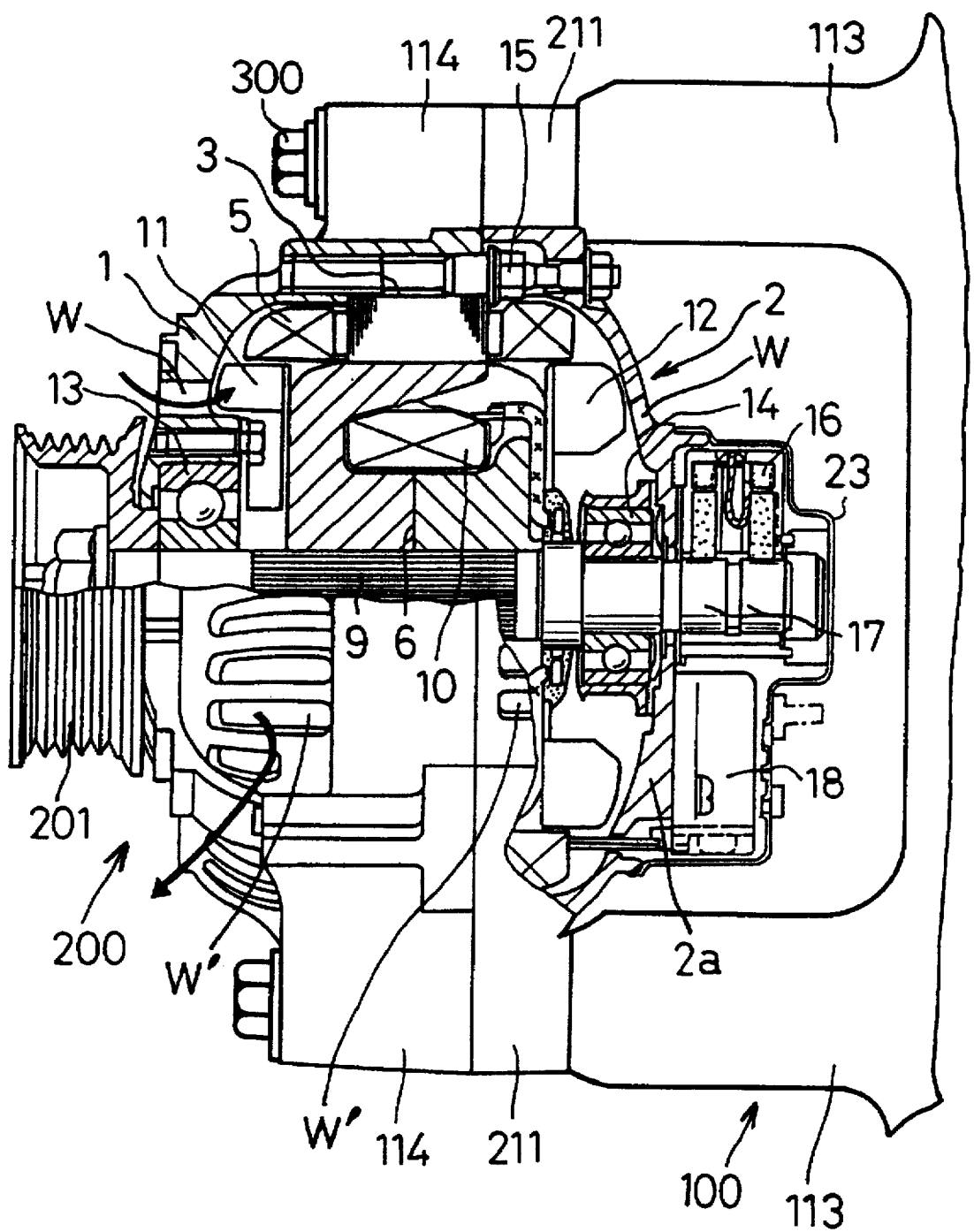
FIG. 1 is a constructional diagram of a motor vehicle AC generator according to a first preferred embodiment of the present invention.

Referring now to FIG. 1, the overall construction and parts arrangement of a motor vehicle AC generator according to a first preferred embodiment of the present invention are described.

Designated by the reference numeral 100 is an engine block, and designated by the reference numeral 200 is a motor vehicle AC generator. A pulley 201 mounted on a rotary shaft 9 of the generator 200 is driven by an engine of which the engine block 100 is a part.

A housing of the generator 200 comprises a drive frame 1 and a rear frame 2 formed by aluminum die casting, which are joined by a plurality of bolts 15. The drive frame 1 and rear frame 2 each have a pair of stays 114, 211 projecting from the outside of their respective curved walls, and the stays 114,211 individually have through holes (not shown) formed in a horizontal direction for receiving stud bolts 300. A pair of projections 113 having threaded holes extend horizontally from the external side surface of the engine block 100 for mounting the generator 200. As the stud bolts 300 are passed through the through holes in the stays 114,211 and screwed into the threaded holes of the projections 113, the generator 200 is firmly fixed to the engine block 100 without using any bracket or other intermediate members.

An end cover 23 made by forming an aluminum plate is fixed to a rear end wall 2a of the rear frame 2 and a voltage regulator 18 enclosed by the end cover 23 is fixed to the outside surface of the rear end wall 2a.

On the inside curved surface of the drive frame 1, there is fixed a stator core 3, on which three-phase armature windings 5 are wound. Bearings 13 and 14 respectively fixed to the frames 1 and 2 rotatably support the shaft 9, to which a rotor core 6 is secured. A field coil 10 is wound around the rotor core 6 and cooling fans 11 and 12 are mounted at both ends of the rotor core 6. Designated by W are cooling air inlet holes provided in the end walls of the drive frame 1 and rear frame 2, and designated by W' are cooling air outlet holes provided around the curved side walls of the drive frame 1 and rear frame 2.

Figure 2:
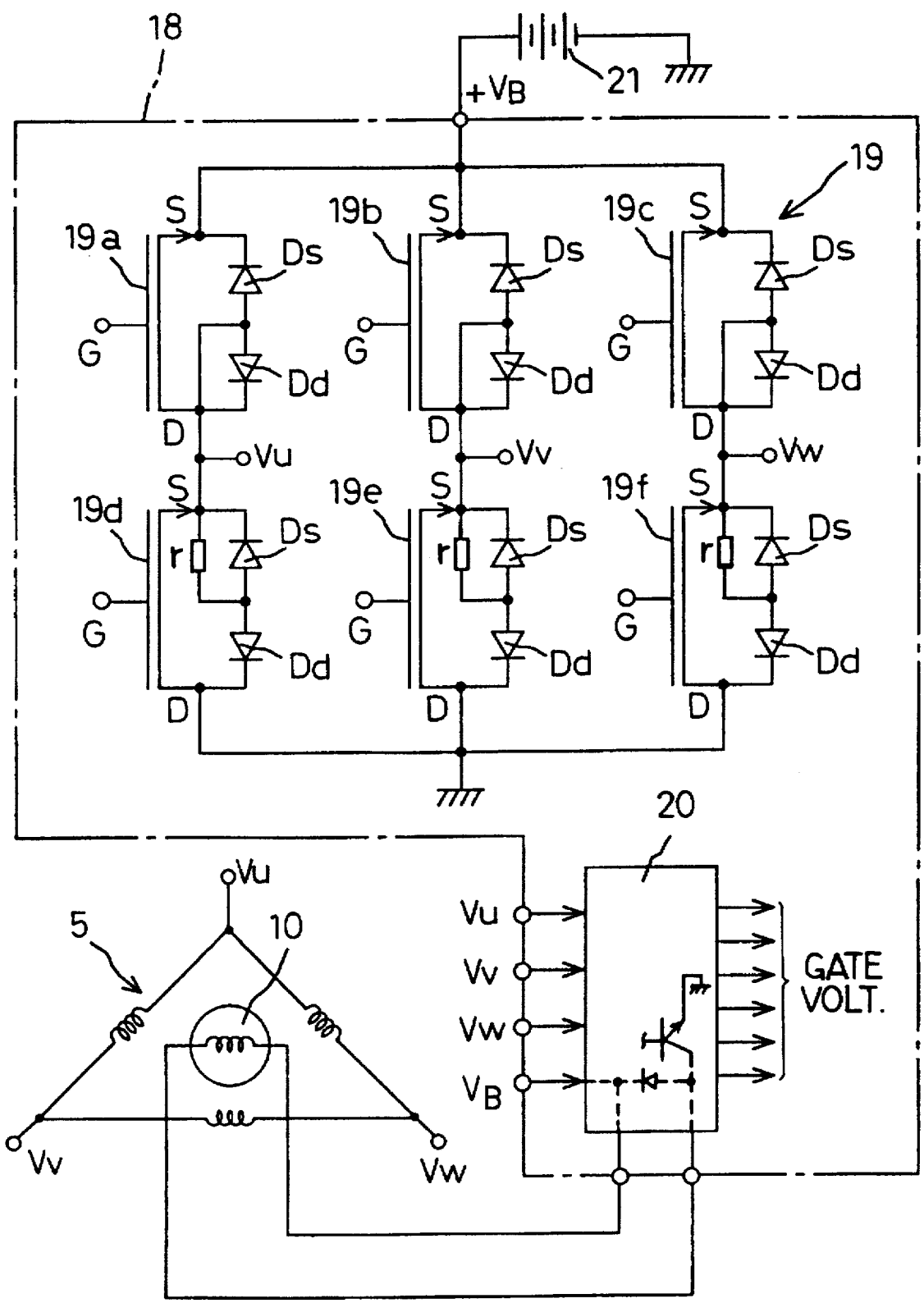
FIG. 2 is a circuit diagram of the motor vehicle AC generator of FIG. 1.

Referring now to FIG. 2, the voltage regulator 18 comprises a three-phase full-wave rectifier 19 and a controller 20 for producing a gate control voltage for on/off control of MOS power transistors 19a–19f of the rectifier 19 and for on/off control of a field current (gate controller/regulator 20).

The rectifier 19 is a three-phase full-wave rectifier including the n-channel enhancement-type MOS power transistors 19a–19f made by using monocrystalline SiC as a base material. The high side transistors 19a–19c individually connect between output terminals of respective phases of the three-phase armature windings 5 and a high-potential terminal of a battery 21, while the low side transistors 19d–19f individually connect between the output terminals of respective phases of the three-phase armature windings 5 and a low-potential terminal of the battery 21.

The voltage regulator 18 is connected to the field coil 10 by way of brushes 16 and slip rings 17. As individual phase voltages generated are inputted from the output terminals of the three-phase armature windings 5 to the voltage regulator 18, gate voltages applied to individual gate electrodes of the MOS power transistors 19a–19f are controlled based on these input signals.

While the rotor core 6 is rotated by the engine (not shown), the voltage regulator 18 takes a voltage reading of the battery 21, and makes and breaks the field coil 10 so that the voltage is kept at a constant level. Consequently, a full-wave rectified direct current produced by the three-phase full-wave rectifier 19 flows into the battery 21 to charge it while part of the charged electricity is consumed by on-board electronic loads, for instance. The cooling fans 11 and 12 rotate to cool the field coil 10, three-phase armature windings 5, voltage regulator 18, and so on.

Now, on/off control of the individual MOS power transistors 19a–19f that is performed by the controller 20 is described below.

The controller 20 acquires information on the individual phase voltages Vu, Vv, Vw, which are output terminal potentials of the individual three-phase armature windings 5. The controller 20 then determines which of line-to-line voltages Vu-Vv, Vv-Vw, Vw-Vu is higher than the voltage between the terminals of the battery 21, and turns on one of the high side MOS power transistors 19a–19c and one of the low side MOS power transistors 19d–19f in such a way that the line-to-line voltage thus selected is applied to the battery 21. As a result, a charging current flows into the battery 21 from one selected three-phase armature winding.

Like an ordinary voltage regulator, the controller 20 senses the terminal voltage of the battery 21, compares this voltage with a predefined reference voltage, and performs on/off control of an exciting current based on the result of voltage comparison in order to maintain the terminal voltage of the battery 21 at a target level in a similar way to conventional systems.

Figure 3:
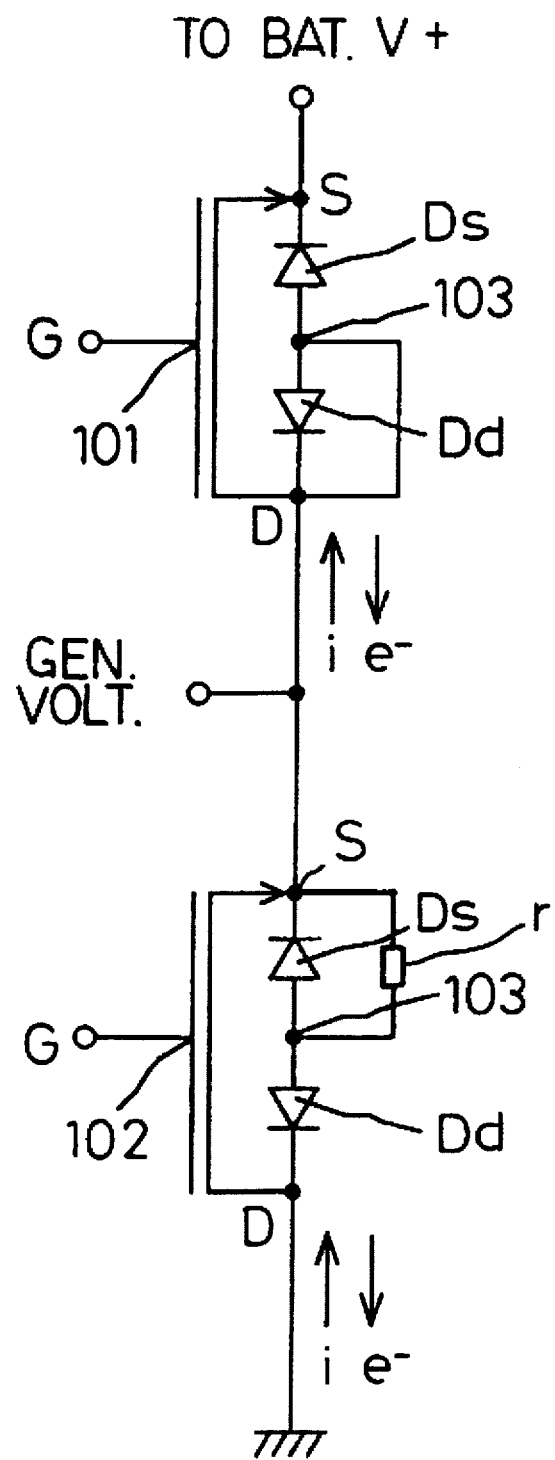
FIG. 3 is an equivalent circuit diagram of an inverter circuit corresponding to a one-phase circuit portion of a three-phase full-wave rectifier of FIG. 1.

The aforementioned SiC MOS power transistor (also referred to as the "MOS transistor" in a simplified form) type three-phase full-wave rectifier is described in further detail with reference to FIGS. 3–5, of which FIG. 3 shows an inverter circuit which corresponds to a one-phase circuit portion of the MOS power transistor type three-phase full-wave rectifier of this embodiment, FIG. 4 shows an example of cross-sectional structure of the MOS power transistors 19a–19c, and FIG. 5 shows an example of cross-sectional structure of the MOS power transistors 19d–19f.

In the n-channel MOS power transistor-based inverter circuit shown in FIG. 3, the drain electrode D of the high side MOS power transistor 101 and the source electrode S of the low side MOS power transistor 102 are connected to the output terminal of one phase of the three-phase armature windings 5, the drain electrode D of the low side MOS power transistor 102 is connected to the low-potential terminal of battery 21, and the source electrode S of the high side MOS power transistor 101 is connected to the high-potential terminal of the battery 21. It is to be noted that the direction of the charging current and the moving direction of electrons during a charging process are opposite to each other and the source electrode S is the electrode from which charge carriers are injected into a channel during the charging process.

In both of the MOS power transistors 101 and 102, there are formed a source electrode side parasitic diode Ds between a p-type well region 103 (i.e., a region immediately beneath a gate electrode) and the source electrode S and a drain electrode side parasitic diode Dd between the p-type well region 103 and the drain electrode D, as illustrated. The p-type well region 103 and drain electrode D of the MOS power transistor 101 are shorted out to give a potential to the p-type well region 103. With this configuration, the source electrode side parasitic diode Ds serves to prevent a reverse current from the battery 21.

On the other hand, the p-type well region 103 and source electrode S of the MOS power transistor 102 are connected to each other via a high-resistance resistor r for current limitation to give a potential to the p-type well region 103.

Referring now to FIG. 4, an example of cross-sectional structure of the MOS power transistor 101 which constitutes each of high side switches 19a, 19b and 19c in this embodiment is explained.

An n-type withstand layer 105 is formed upon an n+-type substrate 106 through an epitaxial growth process, the p-type well region 103 is formed upon the surface of the n-type withstand layer 105 through an epitaxial growth process, and an n+-type region 104 is formed upon the surface of the p-type well region 103 through an epitaxial growth process. After masking the surface of a wafer with a layer of resist or insulator just leaving a desired trench pattern uncovered, a trench 108 is created by way of a well-known reactive ion etching (RIE) technique. Then, a gate insulating layer 109 consisting essentially of silicon dioxide is formed on the surface of the trench 108 by a thermal oxidization method, and after that a gate electrode 110 consisting essentially of doped polysilicon is formed in the trench 108. Subsequently, a metallic electrode 111 is bonded to the surfaces of the n+-type region (drain electrode) 104 and p-type well region 103 and a metallic electrode 112 is bonded to the surface of the n+-type substrate (source electrode) 106 to complete a device.

Referring now to FIG. 5, an example of cross-sectional structure of the MOS power transistor 102 which constitutes each of low side switches 19d, 19e and 19f in this embodiment is explained. The structure of FIG. 5 differs from that of FIG. 4 in that the drain D and p-type well region 103 are not shorted out and the p-type well region 103 is connected to the source S via a high-resistance resistor r. Accordingly, the source S of each of high side switches 19a, 19b and 19c is configured with the substrate 106 shown in FIG. 4 while that of each of low side switches 19d, 19e and 19f is configured with an n+-type region 104 shown in FIG. 5.

It would therefore be recognized that when a high voltage (e.g., +300 V) is applied across the source electrode 106 and drain electrode 111 while the MOS power transistor 101 is ON, a depletion layer spreads chiefly into the n-type withstand layer 105 to withstand this high voltage in this embodiment. As a result, the n-type withstand layer 105 becomes a parasitic source resistance Rs and causes a power loss due to its own resistance and an increase in channel resistance as previously mentioned. It is, however, possible to significantly improve situations regarding the requirements for the thickness of the n-type withstand layer 105 and its doping concentration in this embodiment because monocrystalline SiC is used as the device material, compared to conventional Si devices.

The following discussion focuses on design conditions of the n-type withstand layer 105 for giving it a withstand voltage of 300 V.

In the case of Si, its breakdown electric field strength is about 30 V/μm. If the withstand voltage of 300 V is to be provided by the n-type withstand layer 105 alone for the sake of simplification, the required thickness of the withstand layer is about 20 μm, its doping concentration about $1\times10^{15}$ atoms/cm$^3$, and its resistivity about 5 Ω·cm.

On the other hand, assuming that the breakdown electric field strength of SiC is 400 V/μm, the required thickness of the n-type withstand layer 105 is about 4 μm, its doping concentration about $2\times10^{15}$ atoms/cm$^3$, and its resistivity about 1.25 Ω·cm. It is therefore possible to reduce the resistance of the n-type withstand layer 105 of the SiC MOS power transistor down to 1/20th that of the n-type withstand layer 105 of the Si MOS power transistor.

To summarize, the aforementioned parasitic source resistance Rs of the SiC MOS power transistor can be reduced to 1/20th that of the Si MOS power transistor, and its channel resistance can be significantly reduced as described above. A synergistic effect of these reductions in resistance makes it possible to produce a three-phase full-wave rectifier for a motor vehicle AC generator featuring extremely low power loss characteristics.

More particularly, it has been found that the three-phase full-wave rectifier 19 having an excellent efficiency which can hardly be expected from the conventional rectifiers can be produced by enhancing the breakdown electric field strength of the n-type withstand layer 105 by the use of SiC. Needless to say, the above-described relationship applies also to a situation where a high voltage other than 300 V is applied to the n-type withstand layer 105.

Figure 6:
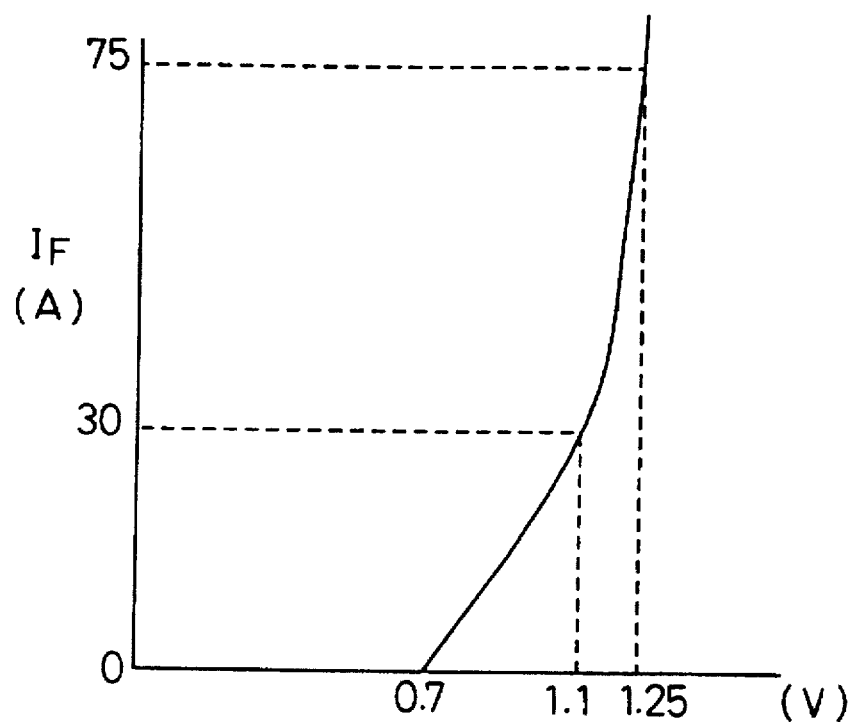
FIG. 6 is a graph showing volt-ampere characteristics of a conventional p-n diode using Si as a base material.
Figure 7:
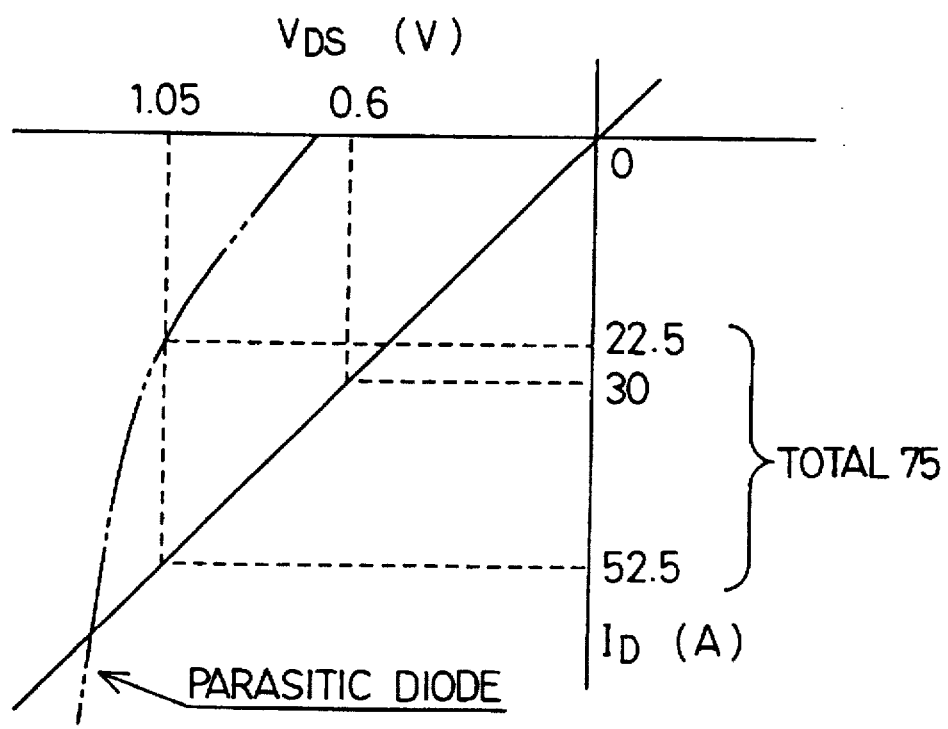
FIG. 7 is a graph showing volt-ampere characteristics of a conventional MOS power transistor using SiC as a base material.
Figure 8:
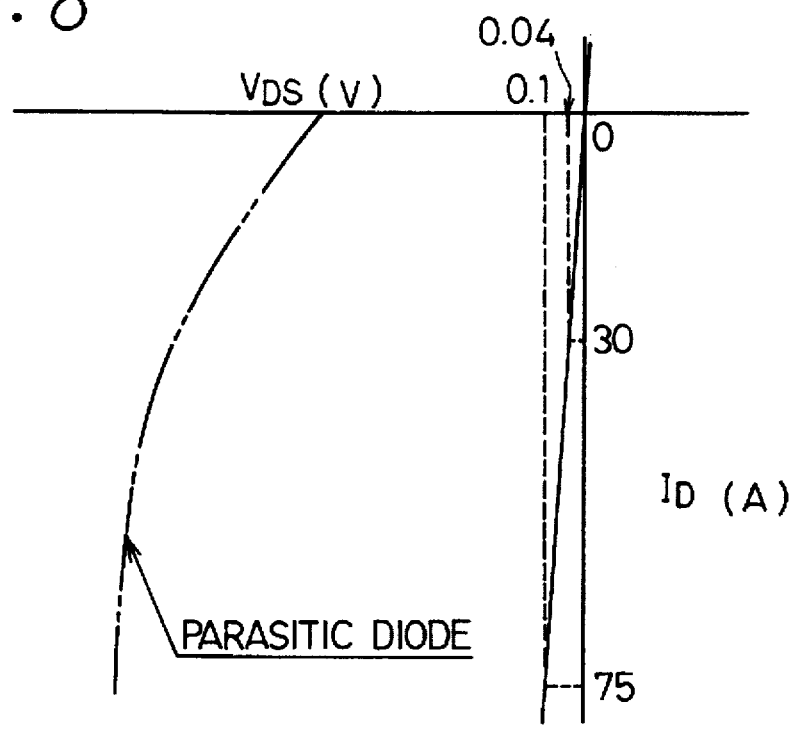
FIG. 8 is a graph showing volt-ampere characteristics of a MOS power transistor using SiC as a base material according to the first embodiment.

Shown in FIGS. 6–8 are volt-ampere characteristics of a Si diode, a Si MOS power transistor and a SiC MOS power transistor produced using the same chip size and design rules and having a common withstand voltage of 250 V. FIG. 6 shows characteristics of the Si diode; FIG. 7 shows characteristics of the Si MOS power transistor; and FIG. 8 shows characteristics of the SiC MOS power transistor, according to experimental results. As will be recognized from FIGS. 6–8, the three-phase full-wave rectifier 19 of this embodiment has made it possible to reduce the power loss by 90% or over at an output current of 75 A compared to the conventional three-phase full-wave rectifiers.

Figure 9:
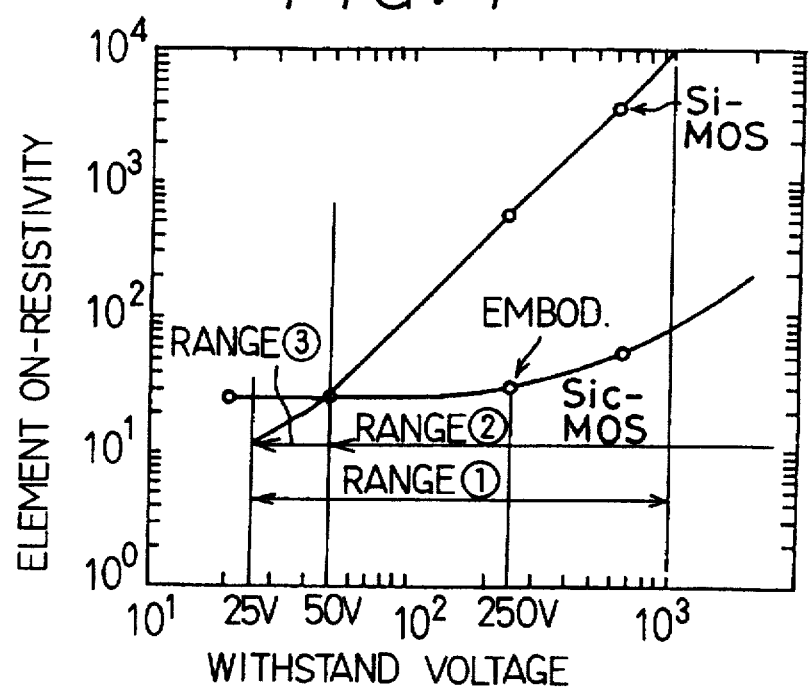
FIG. 9 is a graph showing relationships between withstand voltages and channel resistances of the MOS power transistors of FIGS. 6 and 7.

Shown in FIG. 9 are results of calculation of specific on-resistance of the MOS power transistors obtained when their withstand voltages are varied. The specific on-resistance is the sum of the channel resistance and the resistance of the n-type withstand layer 105, and especially the channel resistance varies depending on various factors. It is, however, understood from FIG. 9 that the resistance of the n-type withstand layer 105 becomes dominant in a high withstand voltage domain.

In other words, although the channel resistance varies very little even when the withstand voltage increases (disregarding the increase in the channel resistance due to the earlier-mentioned feedback effect caused by the increase in the parasitic source resistance Rs), the resistance of the n-type withstand layer 105 increases proportionally with the withstand voltage. From this, it is understood that whereas the specific on-resistance proportionally increases as the withstand voltage increases from about 25 V in Si, an increase in the resistance of the n-type withstand layer 105 can almost be disregarded up to a withstand voltage of 250 V, and the specific on-resistance begins to increase only after the withstand voltage has exceeded 250 V in SiC.

Figure 10:
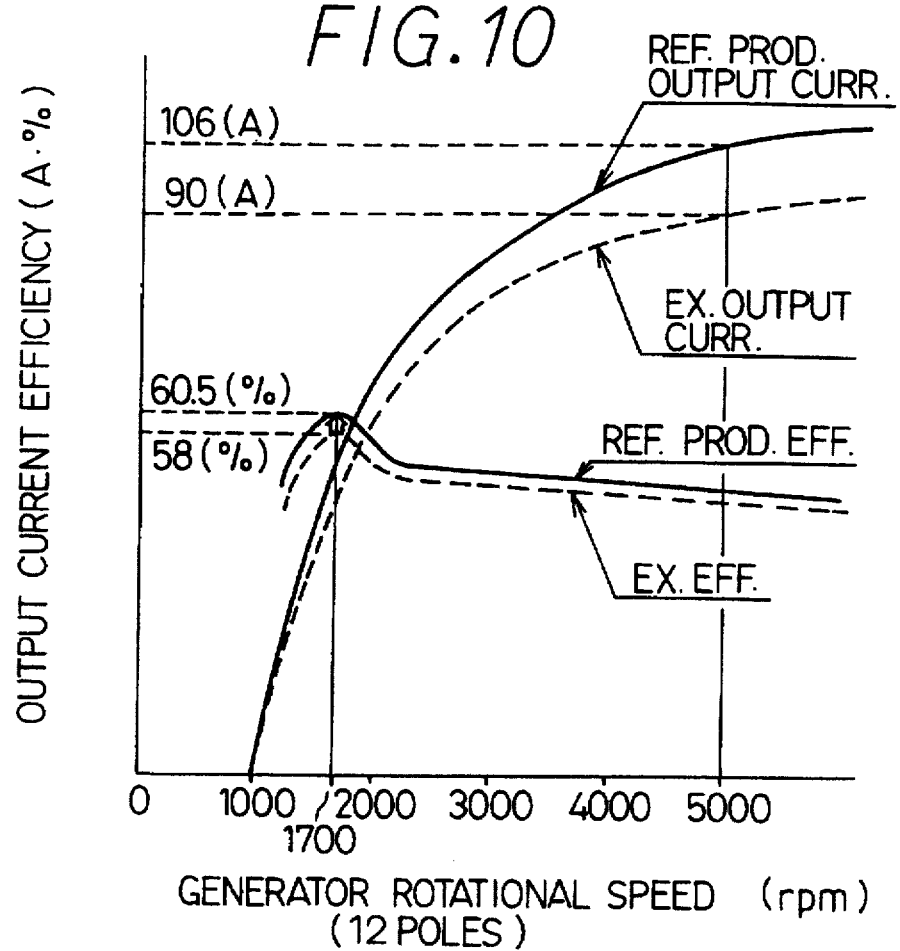
FIG. 10 is a graph showing relationships between output currents and rotational speeds, and between efficiencies and rotational speeds of motor vehicle AC generators employing an Si MOS power transistor type three-phase full-wave rectifier and a SiC MOS power transistor type three-phase full-wave rectifier.

Characteristics of motor vehicle AC generators each employing a three-phase full-wave rectifier 19 comprising SiC MOS power transistors or Si MOS power transistors (comparative example) of the same chip size are shown in FIG. 10 as reference information for this embodiment. It is to be noted that the three-phase full-wave rectifier 19 was fixed to the outside surface of the rear frame 2 in either case to provide the same comparative conditions with the conventional configuration. It was found that the output current was increased by about 10% (in a generator running at 5000 rpm with 12 poles) and rectification efficiency was improved by about 3 to 5% because rectification loss could almost be disregarded.

The following discussion deals with withstand voltages and resistances of the Si MOS power transistors and SiC MOS power transistors with particular attention given to their mutual relationships.

The MOS power transistors 19a–19f used in the above-described embodiment are designed for a withstand voltage of 250 V using 6H—SiC as a base material. Analytical results of resistance values of the three-phase full-wave rectifier 19 for the motor vehicle AC generator using the 6H—SiC MOS power transistors 19a–19f and the three-phase full-wave rectifier 19 for the motor vehicle AC generator using the Si MOS power transistors are discussed in the following. It is to be noted that the increase in the channel resistance due to the feedback effect of the parasitic source resistance Rs is disregarded in the discussion herein. In addition, it is assumed that the individual MOS power transistors have vertical circuit structures shown in FIGS. 4 and 5.

Resistance R of a transistor is the sum of its channel resistance rc and the resistance rb of the n-type withstand layer 105. Using the equations shown below, the resistance of the 6H—SiC MOS power transistors was calculated to be about 1/15th that of the Si MOS power transistors:

$$rc = L/W \cdot (1/\mu s \cdot es \cdot \epsilon o)^{-1} \cdot (Tox/(Vg-Vt)) \quad (2)$$

$$rb = 4Vb^2 \cdot (1/\mu \cdot es \cdot \epsilon o \cdot Ec \cdot A) \quad (3)$$

where breakdown electric field strength Ec of Si is $3 \times 10^5$ V/cm, that of SiC is $3 \times 10^6$ V/cm, relative dielectric constant es of Si is 11.8, that of SiC is 10.0, area A is 1 mm$^2$ for both Si and SiC, Vb is breakdown voltage (withstand voltage), μ is bulk mobility of electrons, which is 1100 cm$^2$/V·S for Si and 370 cm$^2$/V·S for SiC, channel length L is 1 μm for both Si and SiC, channel width W is 220 μm for both Si and SiC, and μs is channel mobility of electrons, which is 500 cm$^2$/V·S for Si and 100 cm$^2$/V·S for SiC.

From the above equations, it has been found that SiC provides smaller resistance values at withstand voltages of 50 V and above. Because a substrate is used as a drain in the above calculations, resistance values of Si should significantly increase due to the increase in the channel resistance caused by the aforementioned feedback effect of the parasitic source resistance Rs when the substrate is used as a source. It is therefore expected that the SiC MOS power transistors provide low resistances at withstand voltages of 100 V and above no matter whether the design rules are varied to some extent.

Now, the construction and parts arrangement of the voltage regulator 18 of this embodiment are described in greater detail with reference to FIG. 11, which shows a cross-sectional view of the voltage regulator 18, and particularly the construction of the rectifier 19.

The voltage regulator 18 is provided with a shallow box-like aluminum-made low side plate (grounding side cooling fin) 190 and an aluminum-made cover (grounding side cooling fin) 191 welded to the periphery of the low side plate 190. A bolt (not shown) is passed through a hole (not shown) made in the low side plate 190 and screwed into a threaded hole (not shown) in the rear end wall 2a of the rear frame 2 in order to fix the low side plate 190 to the rear end wall 2a of the rear frame 2. With this construction, heat transferred from the later-described MOS power transistors (semiconductor chips) to the cover 191 can be efficiently conveyed to the rear end wall 2a via the low side plate 190.

The n+ substrates 106 of the MOS power transistors 19d–19f (see FIG. 5) which constitute low side switches are bonded to the inside surface of the cover 191. In addition, a dielectric resin film 194 is bonded to a groove 191a formed in the cover 191 and an aluminum-made B-terminal side cooling fin 195 is bonded onto the groove 191a. An upper surface 195a of the B-terminal side cooling fin 195 is set to align with the height (right-to-left directions in FIG. 11) of an upper surface 191b of the cover 191. The n+ substrates 106 of the MOS power transistors 19a–19c (see FIG. 4) which constitute high side switches are bonded to the upper surface 195a of the B-terminal side cooling fin 195. Furthermore, an alumina wiring substrate carrying a necessary wiring circuit pattern and semiconductor chips constituting the controller 20, which are not shown, are bonded or otherwise attached to the upper surface 191b of the cover 191. The MOS power transistors 19b, 19c, 19e and 19f are located at positions not visible in FIG. 11.

On the upper side (directed to the rear end wall 2a) of MOS power transistors 19a and 19d, there are exposedly provided contact electrodes (not shown) for connecting to the gate electrodes 110 and n+ surface regions 104 with a solder bump 196 created on each contact electrode, and the contact electrode of each n+ surface region 104 is connected to the bottom of a copper-made bus bar 197 via the solder bump 196. One end of the bus bar 197 is connected to a pin 198 by the solder bump 196 and the pin 198 is connected to a U-phase output terminal of the armature windings 5. Designated by the numeral 199 is a hermetic seal. The other MOS power transistors 19b, 19c, 19e and 19f are arranged and connected in a similar way.

The contact electrodes for connecting to the gate electrodes 110 which are formed on the top of the MOS power transistors 19d–19f are individually connected to corresponding contact electrodes formed on the top of the semiconductor chips (not shown) constituting the controller 20 by means of bonding wires (not shown) and circuit elements on the alumina wiring substrate.

Furthermore, resin 1900 is injected into the space enclosed by the low side plate 190 and cover 191 to seal and strengthen the connections between the individual bus bars 197 and solder bumps 196 and to improve thermal conductivity and moisture resistance.

In addition, bolt-shaped B terminals (not shown) protruding from the bottom surface of the B-terminal side cooling fin 195 penetrate the cover 191 toward the outside. The gap between each B terminal and the cover 191 is hermetically sealed and electrically insulated.

According to the above-described embodiment, it is possible to reduce the sizes of the B-terminal side cooling fin 195 and grounding side cooling fins 190 and 191 compared to the conventional arrangement because heat generation of the three-phase full-wave rectifier 19 is significantly reduced and SiC provides excellent thermal resistance. Also because the height of projections from the rear end wall 2a can be decreased, it is possible to reduce vibration of the B-terminal side cooling fin 195 and grounding side cooling fins 190 and 191 and improve their durability.

Figure 12:
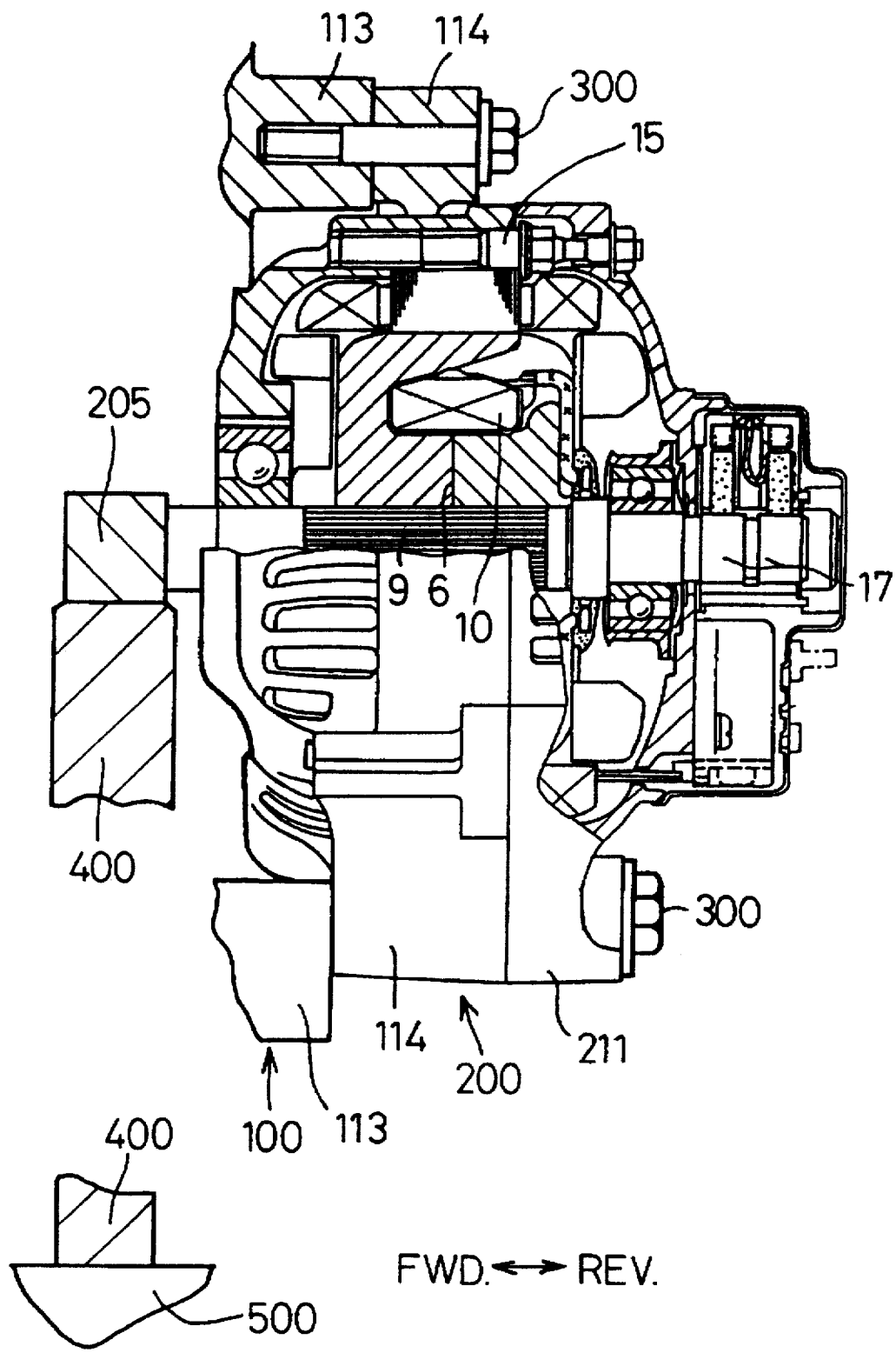
FIG. 12 is a constructional diagram of a motor vehicle AC generator according to a second preferred embodiment of the present invention.

A second preferred embodiment of the present invention is now described with reference to FIG. 12, in which elements performing same functions as in the first embodiment are designated by the same reference numerals.

In this embodiment, a generator 200 is securely fixed to projections 113 having threaded holes extending rearward from the rear end wall of an engine block 100 by means of stud bolts 300 in a way similar to the first embodiment.

A main feature of this embodiment is that a gear 205 is fitted on one end of an output shaft 9 of the generator 200 and is engaged with a ring gear 400 which serves also as a flywheel fitted on a crankshaft 500 of the engine.

Although vibration transmitted to the engine further increases in this configuration, cooling fins 195, 190 and 191 of a rectifier 19 contained in a voltage regulator 18 which is fixed to the generator 200 are made smaller and more lightweight, and their rearward projections from a rear end wall 2a of a rear frame 2 of the generator 200 are small. This serves to reduce overall vibrations and makes it possible to reduce concentration of stresses on joints and connections in the rectifier 19 and improve their reliability.

According to this embodiment, it becomes possible to run the generator 200 at higher rotational speeds and increase its torque.

Figure 13:
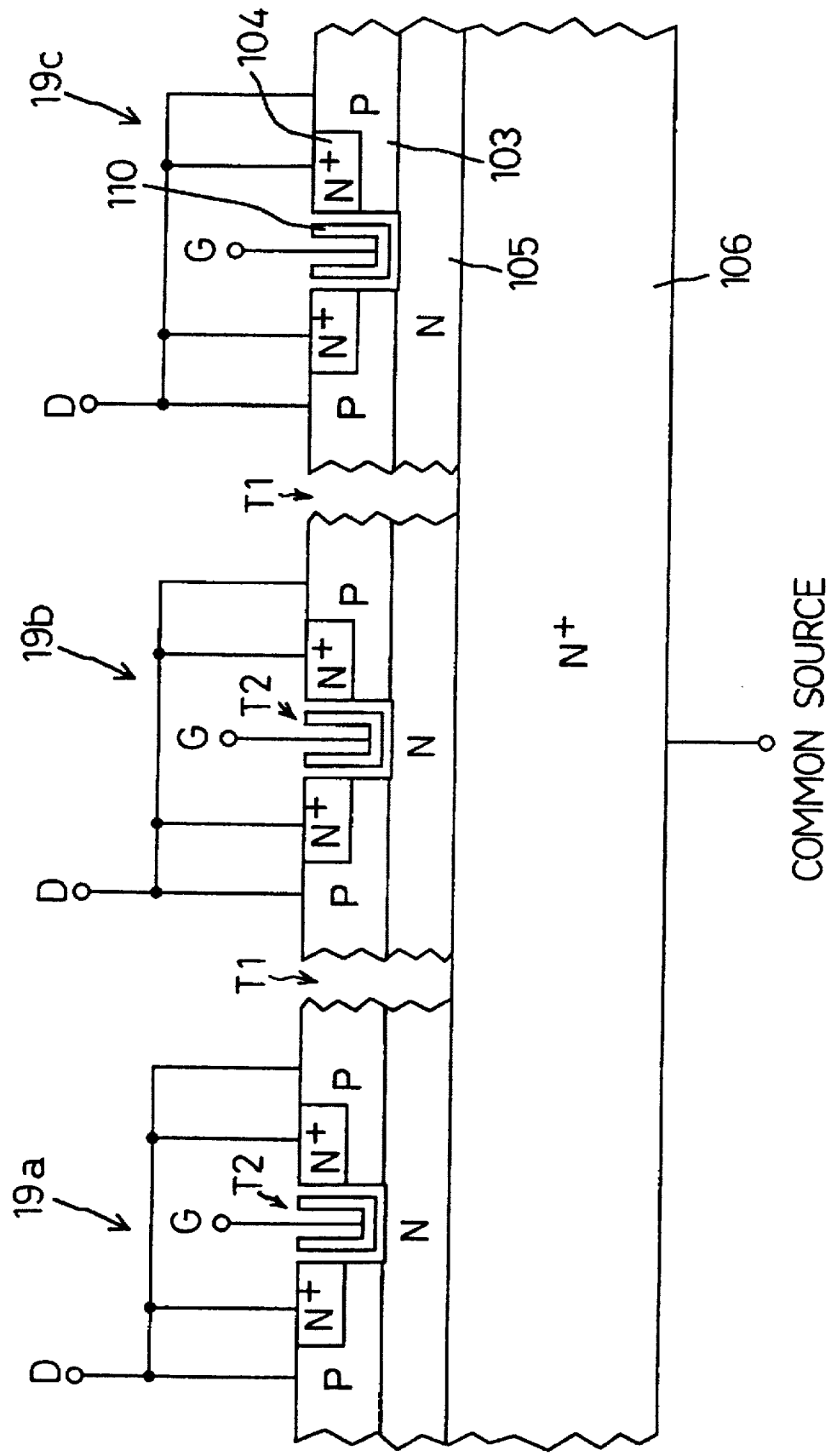
FIG. 13 is a cross-section depicting how high side switches 19a, 19b and 19c are integrated in a single chip in a third preferred embodiment according to the present invention.
Figure 14:
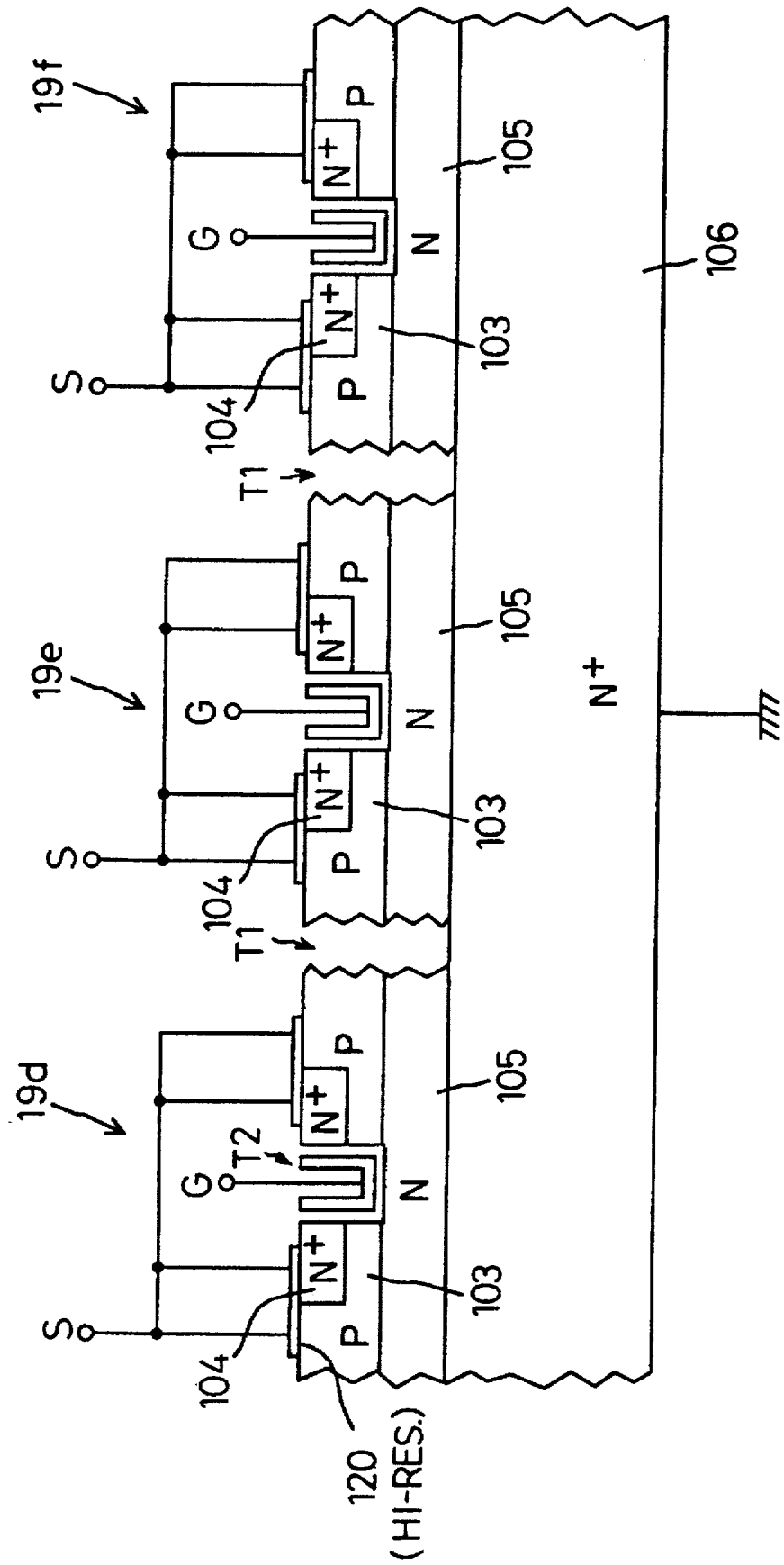
FIG. 14 is a cross-section depicting how low side switches 19d, 19e and 19f are integrated in a single chip in the third embodiment.

FIG. 13 shows a cross-sectional diagram of a third preferred embodiment of the present invention in which the MOS power transistors 19a–19c of the first embodiment are integrated in a single chip, while FIG. 14 shows a cross-sectional diagram in which the MOS power transistors 19d–19f of the first embodiment are integrated in a single chip.

Designated by T1 are deep trenches extending down to a substrate 106 and designated by T2 are shallow trenches extending down to n-type withstand layers 105. A gate insulating layer (not shown) is formed on the surface of each trench T2 and a gate electrode 110 is formed upon the gate insulating layer.

This arrangement serves to achieve a further reduction in physical size.

Figure 15:
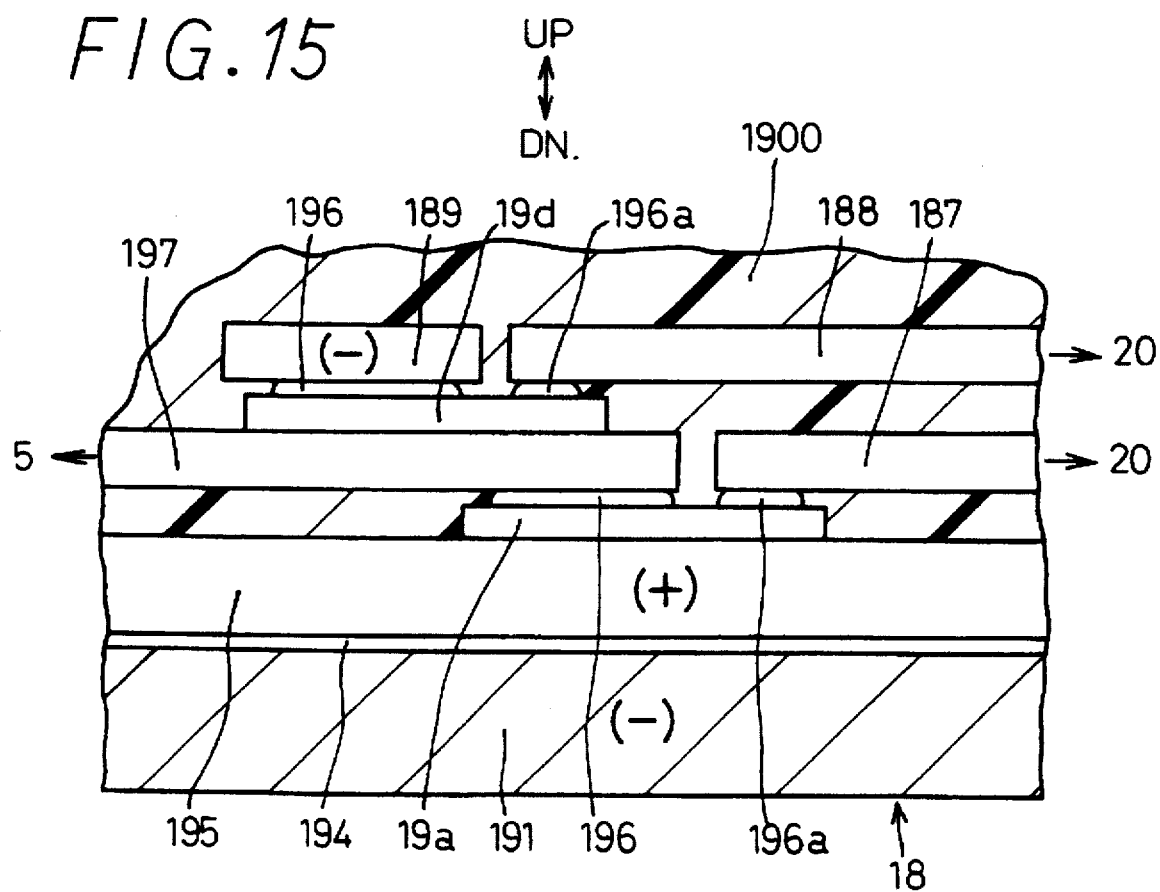
FIG. 15 is a fragmentary cross-section of a voltage regulator 18 according to a fourth embodiment of the present invention.

A fourth preferred embodiment of the present invention is now described with reference to FIGS. 15 and 16, in which elements performing same basic functions as the first embodiment are designated by the same reference numerals.

Figure 11:
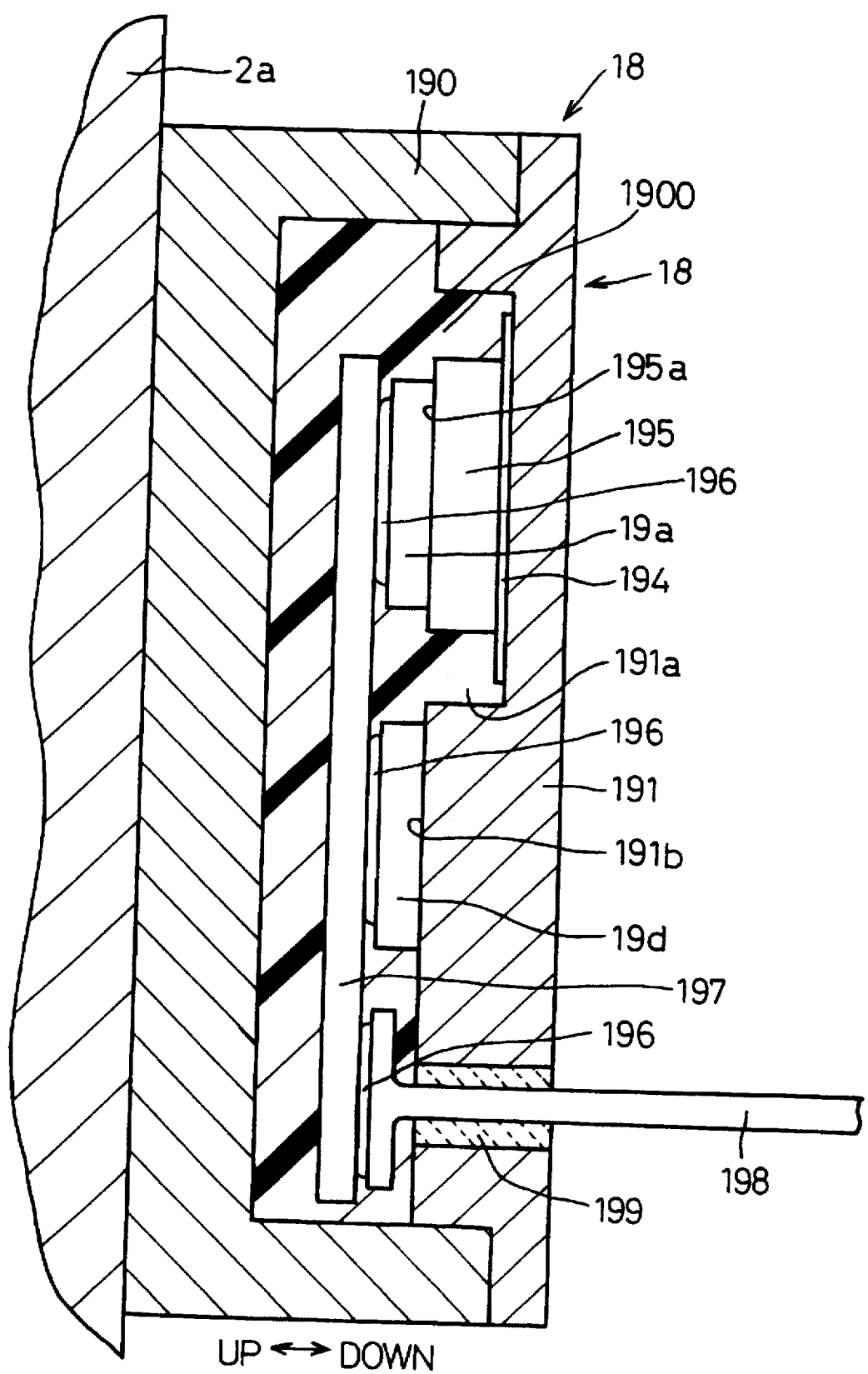
FIG. 11 is a cross-section of a voltage regulator 18 in the first embodiment.

In comparison with the voltage regulator 18 of FIG. 11, in this embodiment a low side switch 19d that is a semiconductor chip in which a MOS power transistor is formed is joined to the top of a bus bar 197, a solder bump 196a formed as a contact for a gate electrode on the top of the low side switch 19d (semiconductor chip) is connected to a bus bar 188 which serves as a gate electrode line, a solder bump 196 formed as a contact for an n+ surface region on the top of the low side switch 19d (semiconductor chip) is connected to a bus bar 189 of which one end is connected to a grounding side cooling fin 191, a solder bump 196a formed as a contact for a gate electrode on the top of a high side switch 19a (semiconductor chip) is connected to a bus bar 187 which serves as a gate electrode line, and a solder bump 196 formed as a contact for an n+ surface region on the top of the low side switch 19d (semiconductor chip) is connected to the bottom of a bus bar 197. This arrangement serves to achieve a further reduction in physical size.

Figure 16:
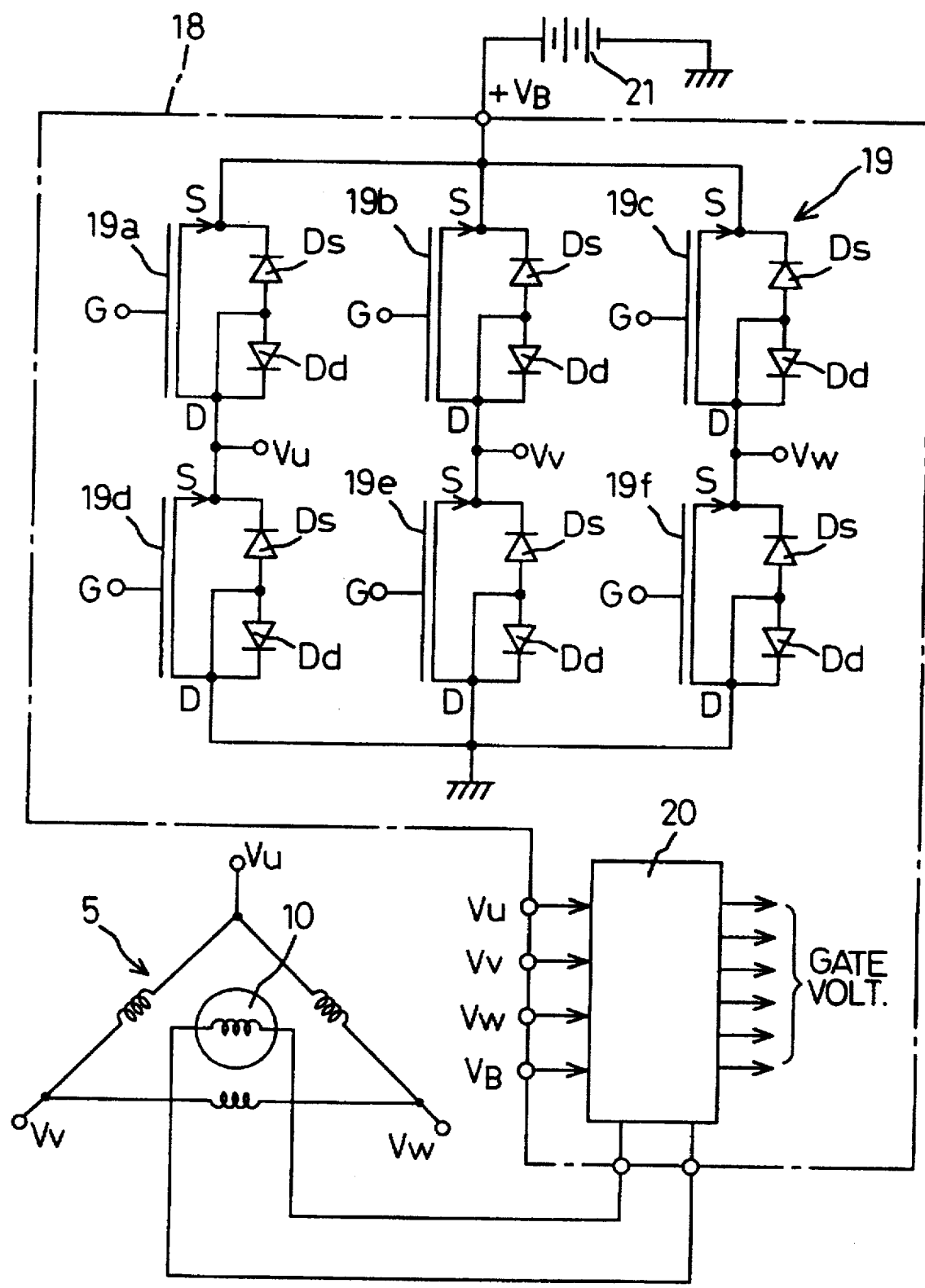
FIG. 16 is a circuit diagram of a motor vehicle AC generator according to the fourth embodiment.

Another remarkable advantage of this embodiment is that p-type well regions of the low side switches 19d, 19e and 19f can be directly grounded without any intermediary high-resistance resistors r (see FIG. 2) as shown in FIG. 16 so that no power loss due to direct currents occurs.

Although the present invention has been fully described in connection with the preferred embodiment thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A motor vehicle alternating current generator comprising:

a housing directly fixed to and directly in contact with an engine block; and a rectifier fixed to and directly in contact with said housing, said rectifier including a semiconductor rectifying device;

wherein said motor vehicle alternating current generator is for being driven by a crankshaft of said engine; and said semiconductor rectifying device of said rectifier fixed to said housing includes metal-oxide-semiconductor transistors each substrate of which includes monocrystalline silicon carbide as a base material;

whereby said rectifier is able to operate despite an increase in operating temperature thereof due to direct connection of said rectifier to said housing and of said housing to said engine block.

2. The motor vehicle alternating current generator according to claim 1, wherein said motor vehicle alternating current generator is for being gear-driven by said crankshaft.

3. The motor vehicle alternating current generator according to claim 2, said rectifier including:

a board on which said MOS transistors are mounted, said board serving also as a cooling fin; and a resin-molded portion which is affixed to said board and encloses internal wiring and said MOS transistors of said rectifier.

4. A motor vehicle alternating current generator comprising:

a housing directly fixed to an engine block; and a rectifier fixed to said housing, said rectifier including a semiconductor rectifying device;

wherein said motor vehicle alternating current generator is for being gear-driven by a crankshaft of said engine;

said semiconductor rectifying device of said rectifier fixed to said housing includes metal-oxide-semiconductor transistors each substrate of which includes monocrystalline silicon carbide as a base material;

said rectifier includes a board on which said MOS transistors are mounted, said board serving also as a cooling fin, and a resin-molded portion which is affixed to said board and encloses internal wiring and said MOS transistors of said rectifier;

said MOS transistors constitute high side switches for individually connecting between each output terminal of armature windings of said generator and a high-potential terminal of a battery as well as low side switches for individually connecting between each output terminal of said armature windings of said generator and a low-potential terminal of said battery;

each of said high side switches is formed by a vertical MOS power transistor of which a p-type well region is connected to an n+ surface region thereof constituting a main electrode to be connected to said windings, and an n+ substrate is bonded to a B-terminal side cooling fin which is connected to said high-potential terminal of said battery; and each of said low side switches is formed by a vertical MOS power transistor of which a p-type well region is connected to an n+ surface region thereof constituting a main electrode to be connected to said windings via a high-resistance resistor, and an n+ substrate is bonded to a grounding side cooling fin which is connected to said low-potential terminal of said battery.

5. The motor vehicle alternating current generator according to claim 4, wherein each of said high side switches is integrated in a first semiconductor chip and each of said low side switches is integrated in a second semiconductor chip.

6. The motor vehicle alternating current generator according to claim 5, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

7. The motor vehicle alternating current generator according to claim 4, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

8. A motor vehicle alternating current generator comprising:
  a housing directly fixed to an engine block; and
  a rectifier fixed to said housing, said rectifier including a semiconductor rectifying device;
  wherein said motor vehicle alternating current generator is for being gear-driven by a crankshaft of said engine;
  said semiconductor rectifying device of said rectifier fixed to said housing includes metal-oxide-semiconductor transistors each substrate of which includes monocrystalline silicon carbide as a base material;
  said MOS transistors constitute high side switches for individually connecting between each output terminal of armature windings of said generator and a high-potential terminal of a battery as well as low side switches for individually connecting between each output terminal of said armature windings of said generator and a low-potential terminal of said battery;
  each of said high side switches is formed by a vertical MOS power transistor of which a p-type well region is connected to an n+ surface region thereof constituting a main electrode to be connected to said windings, and an n+ substrate is bonded to a B-terminal side cooling fin which is connected to said high-potential terminal of said battery; and
  each of said low side switches is formed by a vertical MOS power transistor of which a p-type well region is connected to an n+ surface region thereof constituting a main electrode to be connected to said windings via a high-resistance resistor, and an n+ substrate is bonded to a grounding side cooling fin which is connected to said low-potential terminal of said battery.

9. The motor vehicle alternating current generator according to claim 8, wherein each of said high side switches is integrated in a first semiconductor chip and each of said low side switches is integrated in A second semiconductor chip.

10. The motor vehicle alternating current generator according to claim 9, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

11. The motor vehicle alternating current generator according to claim 8, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

12. The motor vehicle alternating current generator according to claim 1, said rectifier including:
  a board on which said MOS transistors are mounted, said board serving also as a cooling fin; and
  a resin-molded portion which is affixed to said board and encloses internal wiring and said MOS transistors of said rectifier.

13. A motor vehicle alternating current generator comprising:
  a housing directly fixed to an engine block; and
  a rectifier fixed to said housing, said rectifier including a semiconductor rectifying device;
  wherein said motor vehicle alternating current generator is for being driven by a crankshaft of said engine; and
  said semiconductor rectifying device of said rectifier fixed to said housing includes metal-oxide-semiconductor transistors each substrate of which includes monocrystalline silicon carbide as a base material;
  said rectifier includes a board on which said MOS transistors are mounted, said board serving also as a cooling fin, and a resin-molded portion which is affixed to said board and encloses internal wiring and said MOS transistors of said rectifier;
  said MOS transistors constitute high side switches for individually connecting between each output terminal of armature windings of said generator and a high-potential terminal of a battery as well as low side switches for individually connecting between each output terminal of said armature windings of said generator and a low-potential terminal of said battery;
  each of said high side switches is formed by a vertical MOS power transistor of which a p-type well region is connected to an n+ surface region thereof constituting a main electrode to be connected to said windings, and an n+ substrate is bonded to a B-terminal side cooling fin which is connected to said high-potential terminal of said battery; and
  each of said low side switches is formed by a vertical MOS power transistor of which a p-type well region is connected to an n+ surface region thereof constituting a main electrode to be connected to said windings via a high-resistance resistor, and an n+ substrate is bonded to a grounding side cooling fin which is connected to said low-potential terminal of said battery.

14. The motor vehicle alternating current generator according to claim 13, wherein each of said high side switches is integrated in a first semiconductor chip and each of said low side switches is integrated in a second semiconductor chip.

15. The motor vehicle alternating current generator according to claim 14, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

16. The motor vehicle alternating current generator according to claim 13, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

17. A motor vehicle alternating current generator comprising:
  a housing directly fixed to an engine block; and
  a rectifier fixed to said housing, said rectifier including a semiconductor rectifying device;
  wherein said motor vehicle alternating current generator is for being driven by a crankshaft of said engine;
  said semiconductor rectifying device of said rectifier fixed to said housing includes metal-oxide-semiconductor transistors each substrate of which includes monocrystalline silicon carbide as a base material;
  said MOS transistors constitute high side switches for individually connecting between each output terminal of armature windings of said generator and a high-potential terminal of a battery as well as low side switches for individually connecting between each output terminal of said armature windings of said generator and a low-potential terminal of said battery;
  each of said high side switches is formed by a vertical MOS power transistor of which a p-type well region is connected to an n+ surface region thereof constituting a main electrode to be connected to said windings, and an n+ substrate is bonded to a B-terminal side cooling fin which is connected to said high-potential terminal of said battery; and each of said low side switches is formed by a vertical MOS power transistor of which a p-type well region is connected to an n+ surface region thereof constituting a main electrode to be connected to said windings via a high-resistance resistor, and an n+ substrate is bonded to a grounding side cooling fin which is connected to said low-potential terminal of said battery.

18. The motor vehicle alternating current generator according to claim 17, wherein each of said high side switches is integrated in a first semiconductor chip and each of said low side switches is integrated in a second semiconductor chip.

19. The motor vehicle alternating current generator according to claim 18, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

20. The motor vehicle alternating current generator according to claim 17, wherein said grounding side cooling fin is attached to said housing of said motor vehicle alternating current generator in firm contact therewith and said B-terminal side cooling fin is joined to said grounding side cooling fin with a resin insulating layer sandwiched therebetween.

* * * * *